United States Patent
Och et al.

(10) Patent No.: US 6,837,543 B2
(45) Date of Patent: Jan. 4, 2005

(54) SEAT, FOR AUTOMOBILES OR THE LIKE

(75) Inventors: Roland Och, Rottendorf (DE); Gerd Fischer, Röttingen (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 0 days.

(21) Appl. No.: 10/198,123

(22) Filed: Jul. 19, 2002

(65) Prior Publication Data

US 2003/0015901 A1 Jan. 23, 2003

(30) Foreign Application Priority Data

Jul. 20, 2001 (DE) .......................................... 101 35 473

(51) Int. Cl.$^7$ .............................................. A47C 3/025
(52) U.S. Cl. .................................................. 297/284.4
(58) Field of Search ........................... 297/284.8, 284.7, 297/284.4

(56) References Cited

U.S. PATENT DOCUMENTS

| | | | |
|---|---|---|---|
| 5,197,780 A | * | 3/1993 | Coughlin |
| 5,449,219 A | * | 9/1995 | Hay et al. |
| 5,474,358 A | * | 12/1995 | Maeyaert |
| 5,823,620 A | | 10/1998 | Le Caz |
| 5,857,743 A | | 1/1999 | Ligon et al. |
| 5,954,399 A | | 9/1999 | Hong |
| 6,152,531 A | * | 11/2000 | Deceuninck |
| 6,357,826 B1 | * | 3/2002 | Gabas et al. |

FOREIGN PATENT DOCUMENTS

| | | |
|---|---|---|
| DE | 23 39 069 A1 | 2/1975 |
| DE | 198 50 121 A1 | 5/2000 |
| DE | 199 24 591 A1 | 11/2000 |
| EP | 0 540 481 A1 | 9/1992 |
| EP | 0 582 821 A1 | 6/1993 |
| EP | 552904 * | 7/1993 |
| EP | 0 803 400 A2 | 10/1997 |
| GB | 2 316 459 A | 8/1996 |
| GB | 2 316 604 A | 3/1998 |
| GB | 2 335 844 A | 10/1999 |
| WO | WO 93/21800 * | 11/1993 |
| WO | WO 94/00039 * | 1/1994 |
| WO | WO 99/64266 | 12/1999 |
| WO | WO 99/65730 | 12/1999 |
| WO | WO 00/20249 | 4/2000 |

* cited by examiner

*Primary Examiner*—Milton Nelson, Jr.
(74) *Attorney, Agent, or Firm*—Lowe Hauptman Gilman & Berner LLP

(57) ABSTRACT

A seat for an automobile includes a backrest fitted with a frame, an adjusting device inside the backrest in the region of the lumbar vertebral column, an elongated, resiliently bending element running transversely inside the frame, two bowden cables each with a sheath and a traction wire, a drive device at the backrest one rest for each bowden cable sheath in each end zone off the elongated element and through which the traction wire is made to pass in longitudinally displaceable manner, an affixation of the free end of the traction wire at a part of the backrest frame facing it whereby the elongated element is suspended in such manner in the frame that, when a tension is exerted on the traction wire, the elongated element shall be moved forward.

15 Claims, 1 Drawing Sheet

SEAT, FOR AUTOMOBILES OR THE LIKE

TECHNICAL FIELD

The invention relates to an automobile seat, in particular comprising an adjustable system in the back rest in the region of the lumbar vertebra.

BACKGROUND ART

There is a need regarding the backrest of seats such as automobile and office seats and armchairs to adjust the lordotic region in controlled manner in hardness and contour in order to effectively support the anatomically proper curvature of the spinal column also during prolonged sitting. Where called for the position also shall be height-adjustable to allow contour or hardness adjustment in taller people whose lordotic region is somewhat higher, whereas a zone situated farther below shall be selectable as regards shorter people.

The German patent 199 24 591 describes a system implementing padding enhancement for a seat's backrest which comprises a number of leaf spring elements in the lordotic region that run transversely to the backrest and act as padding support. The longitudinal support may be deformed in a direction perpendicular to it. An adjusting device allows displacing the spring element in the zone of the longitudinal support whereby the shape of the padding support will change. Said known document also discloses using at least one resiliently supported element that may be moved to-and-fro the seat surface and/or the backrest surface. A telescoping adjustment system comprises at least two mutually nesting cylindrical tubes of which the threaded segments cooperate in such manner that upon rotation of the outer tube, the inner tube shall be adjusted in the direction of the common axis, the outer tube being rotatable but axially fixed in position, and said adjustment system is used to drive the resiliently supported element. The adjustment system's outer tube is linked to a rotational drive element.

The German patent 23 39 069 discloses a vehicle seat which also allows supporting the backrest vertebral zone by making the backrest bulge in the lordotic region. The bulging zone may be made to more or less pre-bulge at appropriate time intervals. The purpose is to attain alternating enlargement and reduction in size of the intervertebral spaces in order to improve the metabolism of the intervertebral disks and of the tissue surrounding latter.

SUMMARY OF THE INVENTION

The objective of the present invention is to create a seat, in particular for automobiles, which is fitted with a padded support and of simple design as well as integrable, said padded support's position being controllable using simple means.

The invention makes use of an elongated and elastically bending element running transversely to the back rest, namely in the lordotic region of the seated person. Said elongated elastically bending element runs across the full width of the backrest, i.e. of the backrest's frame. Said elongated element may be made integrally from a suitable plastic. However and in another embodiment of the invention, it also may be made of spring steel clad by a plastic.

Said elongated element is connected at its ends to two bowden cables. As is known, bowden cables consist of a traction wire guided within a sheath. In the present invention, one end of said cable is linked to a drive device preferably mounted on the backrest and the other cable end is affixed to the backrest frame. The bowden sheath rests against a mating stop of the elongated element passing said traction wire in longitudinally displaceable manner. When a pull is exerted on the traction wire, the longitudinal element is constrained to move relative to the backrest frame. When the traction wire is appropriately connected to the backrest frame, the elongated element may be displaced forward in this manner, the magnitude of this excursion depending on the adjustment range of the drive device. Preferably and as seen in the direction of sitting, the traction wires are connected to the backrest frame in front of the elongated element, that is, they shall be connected in particular to the lateral frame segments. As a result the elongated element is suspended in adjustable manner from the backrest frame.

The pull on the traction wires may be manual, for instance using a handwheel or a lever generating a tensile motion through the intermediary of a slide, a spindle or the like. A locking winch or the like also may be used. As an alternative to a manual drive device, an electrically driven tension device integrated into the backrest also may be used.

In one embodiment of the present invention, the traction wires are linked through a spring to the backrest frame.

In another embodiment of the present invention, the elongated element in the backrest is supported in height-adjustable manner and can be set by a second drive device at the desired height. As a result the lordotic region of a sitting person may be accommodated.

It is understood moreover that the elongated element may be driven periodically using an appropriate automated drive device in order to massage the spinal column and the lumbar region of the sitting person.

A flexible mat or grid is conventionally integrated into the backrests of motor vehicles. In one embodiment of the present invention, the said elongated element is suspended from such a grid or mat in the frame.

BRIEF DESCRIPTION OF THE DRAWING

An illustrative embodiment of the present invention is elucidated below in relation to the drawings.

DETAILED DESCRIPTION OF THE INVENTION

Figure 1:
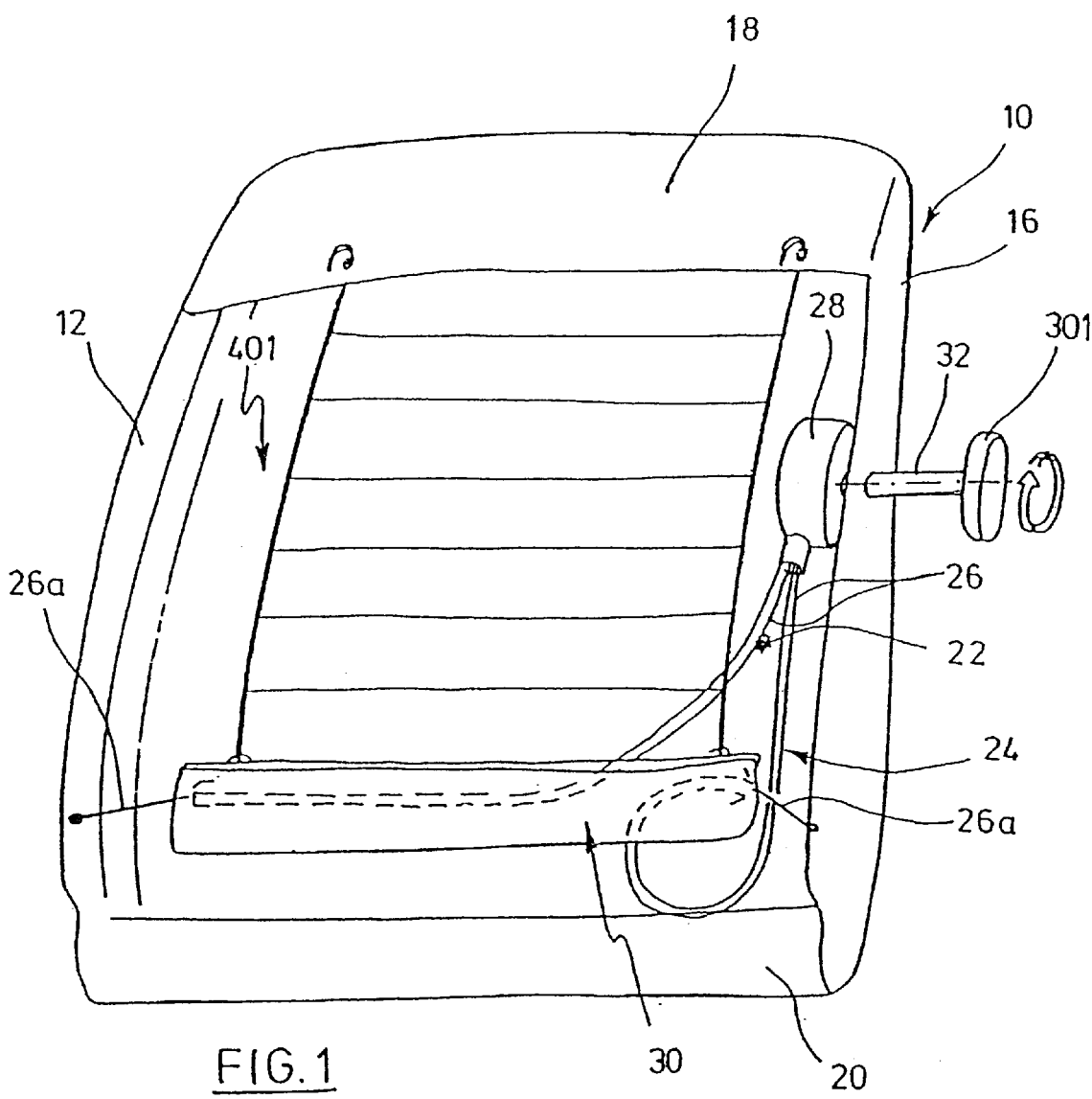
FIG. 1 is a schematic perspective of a backrest fitted with a system of the present invention, and FIG. 2 schematically shows a horizontal section through the backrest of FIG. 1.

FIG. 1 shows a frame 10 of a backrest of an automobile seat together with the side posts 12, 16 and the upper and lower crossbeams 18 and 20. A flat and resiliently bending element 30 of comparatively little height runs in the lower area of the frame 10 closely above the separation between the posts 12, 16. Said element 30 consists integrally of plastic or of spring steel clad with plastic. The elastically bending element 30 may exhibit an arbitrary contour, for instance exhibiting spaced bulges. Such details however are omitted form the Figures. The height of the elastic element 30 is such that a person sitting on the omitted seat shall be situated with the lumbar vertebra in the vicinity of the elongated element 30.

FIG. 1 furthermore shows two bowden cables 22, 24 consisting in known manner of a sheath 26 and a traction wire 26*a*. A drive device 28 not shown in further detail is mounted on the inside of the post 16 and by means of a handwheel 301 which is connected by a shaft 32 acts on the bowden cables 22, 24.

Figure 2:
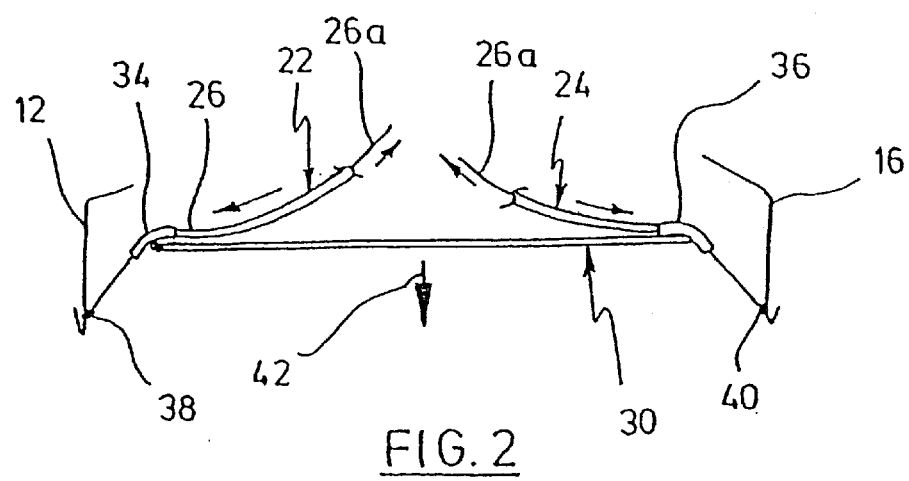

As shown by FIG. 2, a rest 34, 36 is configured in each end zone of the elastic element 30. The traction wire 26*a* of the bowden cables 22, 24 runs in longitudinally displaceable manner through the rests 34 and 36 resp. while the sheath 26 is supported at the rest 34 and 36. The free end of the traction wire 26*a* is linked at 38 and 40 resp. to the post 12 and 16. This linkage may include the insertion of a tensively elastic spring (not shown). FIG. 2 further shows that the linkage points 38, 40 of the traction wire 26*a* are situated toward the front side of the backrest resp. the sitting surface. As a result the elongated element 30 is suspended by means of the bowden cables 22, 24.

A flexible mat or a grid 401 is mounted between the crossbeams 18, 20, being affixed to the upper crossbeam 18 and mounted by the lower side to the elongated element 30.

If, using the handwheel 301 and the drive device 28, tension is exerted on the traction wires 26*a*, the elongated element 30 thereby shall be shifted forward parallel to itself in the direction of the arrow 42 (FIG. 2). By means of this manual adjustment, therefore, the position of the elastically bending elongated element 30 may be shifted forward or back as desired. Moreover height adjustment also may be implemented (omitted) to adapt to the size of the sitting person.

The drive device 28 contains an appropriate transducer changing a rotation of the handwheel 301 into a translation. This change can be implemented for instance using a winch, a cam or in some other manner. Of course an electric or other motor also may be used.

What is claimed is:

1. A seat, comprising:

an upward backrest having a frame;

an elongated, resiliently bending element running crosswise in the frame, said elongated element being adapted to be in a vicinity of a lumbar vertebra of a person when the person is seated on said seat;

two Bowden cables each comprising a sheath and a traction wire passing in longitudinally displaceable manner through said sheath;

a drive device at the backrest for applying tension to the traction wires, and two rests each for the sheath of one of said Bowden cables, said rests being positioned in longitudinally opposite end zones of the elongated element, respectively;

wherein an end of the traction wire of each of the Bowden cables is attached to the frame of said backrest, whereby the elongated element is suspended in such manner in the frame that when tension is applied by the drive device to the traction wires, the elongated element shall be displaced forward; and wherein attachment of the traction wires to the frame is mediated through a spring.

2. A seat, comprising:

an upward backrest having a frame;

an elongated, resiliently bending element running crosswise in the frame, said elongated element being adapted to be in a vicinity of a lumbar vertebra of a person when the person is seated on said seat;

two Bowden cables each comprising a sheath and a traction wire passing in longitudinally displaceable manner through said sheath;

a drive device at the backrest for applying tension to the traction wires, and two rests each for the sheath of one of said Bowden cables, said rests being positioned in longitudinally opposite end zones of the elongated element, respectively;

wherein an end of the traction wire of each of the Bowden cables is attached to the frame of said backrest, whereby the elongated element is suspended in such manner in the frame that when tension is applied by the drive device to the traction wires, the elongated element shall be displaced forward; and wherein the elongated element is either integrally made of plastic or made of spring steel clad in plastic.

3. The seat as claimed in claim 2, further comprising a flexible mat or a flexible grid suspended inside the frame, said elongated element being suspended from a lower end of said flexible mat or grid.

4. The seat as claimed in claim 2, wherein said drive device is common for both said Bowden cables.

5. The seat as claimed in claim 3, wherein the elongated element is supported in height-adjustable manner inside the backrest.

6. A seat, comprising:

a backrest having a frame;

an elongated, resilient element running transversely in the frame, said elongated element being adapted to be in a vicinity of a lumbar vertebra of a person when the person is seated on said seat;

a flexible supporting element suspended inside the frame for supporting the back of the person seated on said seat, said elongated element being suspended from a lower end of said flexible supporting element;

two Bowden cables each comprising a sheath and a traction wire passing in longitudinally displaceable manner through said sheath;

a drive device for applying tension to the traction wires, and two rests each for the sheath of one of said Bowden cables, said rests being positioned in longitudinally opposite end zones of the elongated element, respectively;

wherein an end of the traction wire of each of the Bowed cables is attached to the frame of said backrest, whereby when tension is applied by the drive device to the traction wires, the elongated element shall be displaced forward.

7. The seat of claim 6, wherein said elongated element is attached to said frame solely by said Bowden cables and said lower end of said flexible supporting element.

8. The seat of claim 6, wherein said flexible supporting element further comprises an upper end attached to said frame, said elongated element and said flexible supporting element being attached to said solely by said upper end and the Bowden cables.

9. The seat of claim 6, wherein said elongated element is a flat plate and said supporting element includes a grid.

10. The seat of claim 6, wherein the traction wires of the Bowden cables are attached to a forward portion of the frame of said backrest.

11. The seat of claim 6, wherein the traction wires are attached to the frame via a spring.

12. The seat of claim 6, wherein the elongated element is either integrally made of plastic or made of spring steel clad in plastic.

13. The seat of claim 6, wherein said drive device is common for both said Bowden cables.

14. The seat of claim 6, wherein the elongated element is supported in height-adjustable manner.

15. The seat of claim 6, wherein said elongated element is not an integral part of said flexible supporting element.

* * * * *